United States Patent [19]
Kirchner et al.

[11] Patent Number: 6,108,597
[45] Date of Patent: Aug. 22, 2000

[54] AUTONOMOUS MOBILE ROBOT SYSTEM FOR SENSOR-BASED AND MAP-BASED NAVIGATION IN PIPE NETWORKS

[75] Inventors: Frank Kirchner; Joachim Hertzberg, both of Bonn, Germany

[73] Assignee: GMD-Forschungszentrum Informationstechnik GmbH, Sankt Augustin, Germany

[21] Appl. No.: 09/077,610

[22] PCT Filed: Mar. 1, 1997

[86] PCT No.: PCT/EP97/01027

§ 371 Date: Jun. 2, 1998

§ 102(e) Date: Jun. 2, 1998

[87] PCT Pub. No.: WO97/33212

PCT Pub. Date: Sep. 12, 1997

[30] Foreign Application Priority Data

Mar. 6, 1996 [EP] European Pat. Off. .............. 96103453

[51] Int. Cl.[7] .................................................. G06F 165/00
[52] U.S. Cl. .............................. 701/23; 701/25; 318/587; 180/167
[58] Field of Search .................................. 701/23, 24, 25, 701/26, 27, 28, 300, 301; 700/56; 706/52, 900; 901/1; 318/568.1, 568.12, 587; 180/167, 168, 169

[56] References Cited

U.S. PATENT DOCUMENTS

| | | | |
|---|---|---|---|
| 4,500,970 | 2/1985 | Daemmer | 701/25 |
| 4,829,442 | 5/1989 | Kadanoff et al. | 701/23 |
| 5,001,635 | 3/1991 | Yasutomi et al. | 701/26 |
| 5,032,775 | 7/1991 | Mizuno et al. | 701/25 |
| 5,204,814 | 4/1993 | Noonan et al. | 180/164 |
| 5,363,305 | 11/1994 | Cox et al. | 901/1 |
| 5,525,883 | 6/1996 | Avitzour | 318/587 |
| 5,758,298 | 5/1998 | Guldner | 701/23 |
| 5,911,767 | 6/1999 | Garibotto et al. | 701/25 |

FOREIGN PATENT DOCUMENTS

| | | |
|---|---|---|
| 0 120195 | 10/1984 | European Pat. Off. . |
| 9 320538 | 10/1994 | Germany . |
| 88 04081 | 6/1988 | WIPO . |
| 95 35531 | 12/1995 | WIPO . |

OTHER PUBLICATIONS

Proc. IJCAI–95, 1995, USA pp. 1080–1087, XP000197391.

AT Magazine, vol. 16(2) pp. 53–60.

8095 IEEE Transations on Industry Applications 30 (1994) Sep./Oct. pp. 1321–25.

IROS '94 Proceedings of the IEEE/RSJ/GI International Conference on Intelligent Robots and Systems; pp. 298–305.

*Primary Examiner*—Gary Chin

[57] ABSTRACT

The autonomous mobile robot system is provided with a sensor-based and map-based navigation system for navigating in a pipe network. The navigation is based on the classification of pre-existing natural landmarks. The navigation system can compensate for inaccurate robot system's motion control, sensor information, and landmark classification.

18 Claims, 6 Drawing Sheets

Table 1: Classification of junctions.

| Junction | unknown data sets | classification correct | classification uncertain | classif. uncert. after retry |
|---|---|---|---|---|
| S1  | 6  | 6  | 0 | –  |
| S2  | 6  | 6  | 0 | –  |
| S5  | 15 | 14 | 1 | 0 |
| S6  | 21 | 20 | 1 | 0 |
| S10 | 15 | 12 | 3 | 0 |
| S11 | 18 | 17 | 1 | 0 |

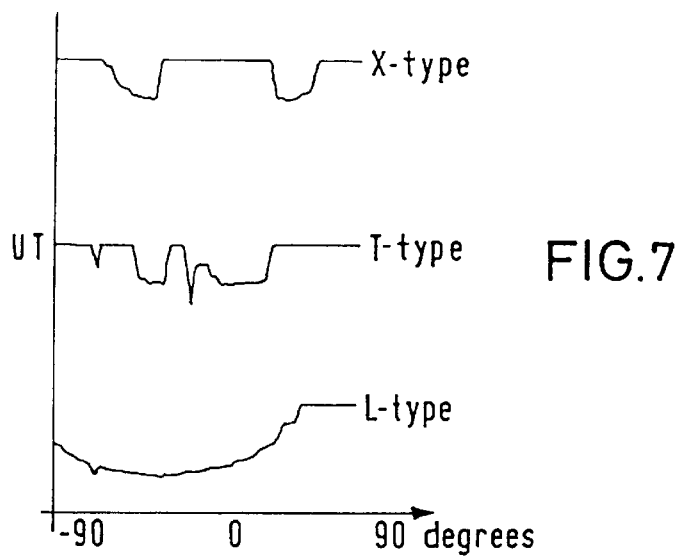
FIG. 7
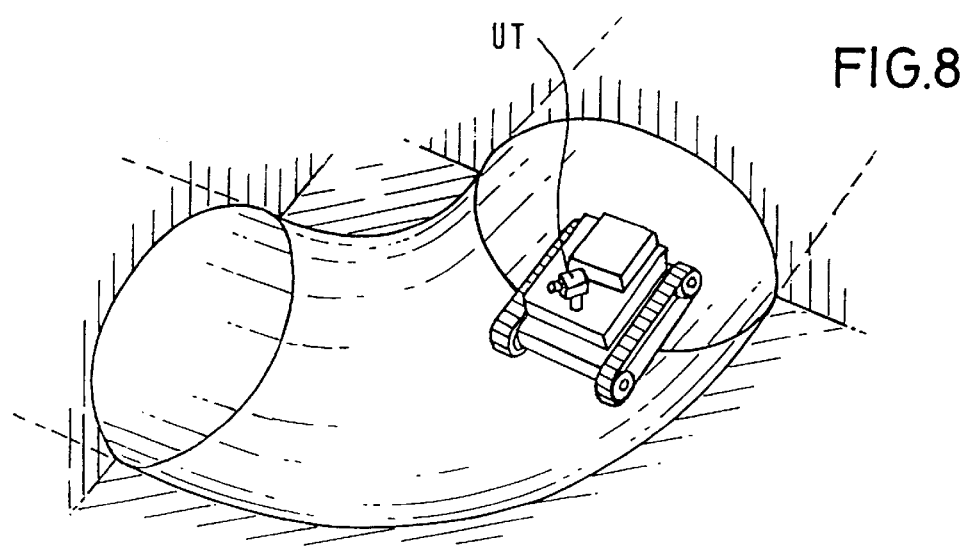
FIG. 8
FIG. 9
|   | S1-2 | S1-5 | S2-1 | ... | S5-1 | S5-6 | ... | S7-6 | ... | S10-6 | ... | S13-11 |
|---|---|---|---|---|---|---|---|---|---|---|---|---|
| S1-2 | 0.0 | 0.0 | .04 | ... | .96 | 0.0 | ... | 0.0 | ... | 0.0 | ... | 0.0 |
| ⋮ | ⋮ | ⋮ | ⋮ | ⋮ | ⋮ | ⋮ | ⋮ | ⋮ | ⋮ | ⋮ | ⋮ | ⋮ |
| S6-7 | 0.0 | 0.0 | 0.0 | ... | 0.0 | .06 | ... | .04 | ... | .9 | ... | 0.0 |
| ⋮ | ⋮ | ⋮ | ⋮ | ⋮ | ⋮ | ⋮ | ⋮ | ⋮ | ⋮ | ⋮ | ⋮ | ⋮ |
| S13-11 | | | | | | | | | | | | |

AUTONOMOUS MOBILE ROBOT SYSTEM FOR SENSOR-BASED AND MAP-BASED NAVIGATION IN PIPE NETWORKS

This application is the national phase under 35 U.S.C. §371 of prior PCT International Application No., PCT/EP97/01027, which has an International filing date of Mar. 1. 1997, which designated the United States of America, the entire contents of which are hereby incorporated by reference.

FIELD OF THE INVENTION

The present invention relates to an autonomous mobile robot system for sensor-based and map-based navigation in pipe networks based on classification of pre-existing landmarks, where said robot system's motion control, sensor information, and landmark classification are allowed to be inaccurate.

BACKGROUND

In the prior art there are known mobile robots for performing in pipe networks. These mobile robots are not autonomous, but leashed by a cable for transmitting energy and control (as for sewer inspection devices) from a remote place outside the pipe network, or they swim passively with the flow of the pipe contents (as in oil or gas pipeline inspection). As far as known to the Applicants, autonomous mobile robots for pipe systems controlling motion actively and having "cut-off the cable" are not known.

For indoor and outdoor environments, autonomous mobile robot systems are known (for example so-called floor robots. I. Nourbakhsh, R. Powers, and S. Birchfield. DERVISH: An office-navigating robot. *AI Magazine,* 16(2) :53–60, 1995.). These known robots are equipped with sensors and maps for navigating using landmarks in the environment as reference points. For many of these approaches, artificial landmarks (beacons) have to be installed in the environment only for the purpose of supporting navigation. Those known robots that make use of natural landmarks often suffer from uncertainty in the landmark classification. If landmarks can be beyond the sensory horizon and drift is possible in the robot motion, navigation is impeded by overlooking landmarks. Moreover, all the known autonomous mobile robots suffer from inaccuracy of motion like drift, slip, overshooting.

In the literature, models and algorithms are known (like so-called POMDPs which is an acronym for Partially Observable Markov Decision Processes for Artificial Intelligence) that take sensor and motion inaccuracy into account. POMDPs are described for example in L. Kaelbling, M. L. Littman, and A. R. Cassandra. Partially observable markov decision processes for artificial intelligence. In I. Wachsmuth, C. -R. Rollinger, and W. Brauer, editors, *KI-95: Advances in Artificial Intelligence,* pages 1–17. Springer Verlag (LNAI vol.981), 1995, and R. Simmons and S. Koenig. Probabilistic robot navigation in partially observable environments. In *Proc. IJCAI-95,* pages 1080–1087, 1995. These algorithms and models work the tore poorly in following a given path, the more likely it is to overlook landmarks. Due to the friction of the cables, cable-driven devices have a very limited range of operation in "natural" pipe networks. On the other side, map-based and sensor-based navigation of autonomous mobile robots is impeded by overlooking landmarks.

It is the object of the present invention to provide a map-based and sensor-based mobile robot system in a network of pipes wherein the robot system is autonomous and has no cable connection to the outside and, wherein the mobile robot system is capable of using "natural" landmarks inherently in the pipe network.

SUMMARY OF THE INVENTION

According to the invention, this object is solved in an autonomous mobile robot system for sensor-based and map-based navigation in pipe networks based on classification of pre-existing landmarks, where said robot system's motion control, sensor information, and landmark classification are allowed to be inaccurate, said system comprising of a vehicle for moving through the pipe network, means for storing the topological map of landmarks, means for determining in advance a path plan through the pipe network from a starting point to a destination point in terms of said topological map, means for effecting physical motion of said vehicle in the pipe network according to said path plan; the control of said motion is allowed to be inaccurate, means for controlling, while moving through the pipe network, the tilt of said vehicle along its axis of motion and the position of the vehicle within the pipe at the pipe bottom;

means for sensing said vehicle's environment such that the vehicle is notified with certainty of the presence of any landmark that the vehicle passes while navigating through the pipe network, means for classifying, based on the output of said sensing means, said landmarks in terms of given landmark classes; said classification is allowed to be inaccurate, means for generating in advance expectations about the sequence of the class of the landmarks to be encountered while following said path plan through the pipe network, means for determining in terms of said topological map a currently plausible position of said vehicle based on the expected landmarks and on the classifications of the landmarks recently passed, means for triggering additional sensor actions and landmark classifications in case that said currently plausible position in the pipe network cannot be determined according to the currently available data, and means for updating said path plan in case that said currently plausible position differs from the position that is expected according to the original path plan.

The autonomous mobile robot system according to the invention comprises a vehicle which moves through the pipe network. A path plan through the pipe network from the starting point to a destination point in terms of a topological map of landmarks stored in a storing means is determined in advance by means of a determining means. Moreover, there are provided means for effecting physical motion of the vehicle in the pipe network according to the path plan. It is pointed out that in the mobile robot system of the invention the control of these motions are allowed to be inaccurate. The mobile robot system according to the invention furthermore is provided with means for controlling the tilt of the vehicle along its axis of motion and a position of the vehicle within the pipe at the pipe bottom while moving through the pipe network. The vehicle is equipped with means for sensing the vehicle's environment wherein the vehicle is notified with certainty of the presence of any "natural" landmark that the vehicle passes while navigating through the pipe network. Based on the output of the sensing means, the landmarks are classified by a classifying means in terms of given and pre-determined landmark classes. Again it is important to note that the classification is allowed to be inaccurate. Expectations about the sequence of the class of the landmarks to be encountered while following the path plan through the pipe network are generated in advance by a generating means. The currently plausible position of the vehicle is determined in terms of the topological map based on the expected landmarks and on the classifications of the landmarks recently passed. This operation is performed in a further determining means. The autonomous mobile robot system according to the invention also includes a triggering means for triggering additional sensor actions and landmark classifications in case that the currently plausible position in the pipe network cannot be determined according to the currently available data. If the currently plausible position differs from the position that is expected according to the original path plan, the latter is updated in an updating means.

The autonomous mobile robot system according to the invention does not use any cable connection to the outside and uses "natural" landmarks like pipe junctions of different geometrical shape classes (X-, Y-, T- or L-shapes) in the pipe network for navigating. No global position or reference frame system is necessary for moving the vehicle through the pipe network.

As expressed above, in a sensor-based autonomous mobile robot system, the classification of landmarks detected can be inaccurate. One reason for this is that the control of motion of the vehicle within the pipe network is inaccurate. Accordingly, the vehicle probably-approaches a natural landmark in a different angle of motion than expected. Due to that reason, the sensing means of the vehicle could not detect a natural landmark as such. The autonomous mobile robot system according to the invention therefore, is provided with a subsystem for not overseeing a natural landmark. Moreover, the mobile robot system is provided with a classifying means for classifying all the natural landmarks detected and means for compensating for possible landmark classification errors and for possible motion control faults.

According to a preferred embodiment of the invention, the means for controlling the tilt of the vehicle and for keeping the vehicle at the bottom of the pipe are provided with inclinometers for measuring the vehicle's tilt along its axis of motion and by steering the vehicle back to the pipe bottom in case that the inclinometers sense a sufficient tilt.

In another preferred embodiment of the invention, the motion control for turning maneuvers of the vehicle at pipe junctions consisting of entries of branched pipes is realized as a closed-loop procedure of a turning movement controlled by the sensing means until the sensing means generates an output signal indicating that the target pipe entry is in front of the vehicle. By means of these features, the vehicle is absolutely autonomously mobile.

Particularly, the means for sensing the vehicle's environment comprise ultrasound transducers, wherein at least some of these ultrasound transducers can be actively moved to produce scans of the geometrical surface of the actual vehicle's environment. The use of actively movable sensors is advantageous for triggering additional sensor actions and landmark classifications in case that the currently plausible position of the vehicle in the pipe network cannot be determined according to the currently available data.

Preferably, the landmark classification is done by a backpropagation network that gets as input the output of the sensing means and that delivers as output a classification of the landmark in terms of the landmark classes. Examples for backpropagation networks are described in D. E. Rumelhart and J. McClelland. *Parallel Distributed Processing*. MIT-Press, Cambridge, Mass., 1986. D. E. Rumelhart and D. Zipser. Feature discovery by competetive learning. *Cognitive Science*, 9:75–112, 1985.

After having detected the presence of a landmark in the autonomous mobile robot system of the present invention, the vehicle is sitting motionless close to the landmark, and the sensing means are actively controlled while sensing the environment in order to acquire the input data for the landmark classification means wherein the active control may include moving some of the sensing means.

These features are preferred in order to obtain a reliable classification of the natural landmarks.

Preferably, in the mobile robot system according to the invention, the currently plausible position within the pipe network is determined by means of modelling the problem of determining a position in the pipe network as a Partially Observable Markov Decision Process (POMDP).

The autonomous mobile robot system according to the invention preferably is used in a network of sewerage pipes, wherein the vehicle is a wheeled vehicle.

BRIEF DESCRIPTION OF THE DRAWINGS

In the following a preferred embodiment of the invention will be described in more detail referring to the drawing in which:

FIG. 7 are charts from the flexible ultrasound sensor (UT) at three different classes of junctions, wherein the upper, middle, and lower traces represent X-type, T-type, and L-type junctions, respectively (as can be seen in the middle trace, there may be noise and other in particular environmental artifacts making the correct classification harder);

FIG. 8 is a perspective view of the robot located at the entrance of an L-shaped junction, wherein the robot is classifying junction S11 of FIG. 1, using its flexible ultrasound sensor (UT) and subsequently starting the turning maneuver to enter the pipe on its right; and FIG. 9 shows a part of the effect matrix for TURN-RIGHT for the robot in the test-pipe network, wherein the empty columns of the three rows shown are to be filled with zero values;

DETAILED DESCRIPTION OF THE PREFERRED EMBODIMENTS OF THE INVENTION

1 Introduction

The public sewerage systems in Germany have to be inspected for repair from time to time. Namely the sewage may leak out, possibly polluting soil and ground water, and it may wash away soil, possibly eroding the foundations of buildings or the underground of streets and pavements. Consequently, considerable effort must be taken to maintain the sewage pipes, which includes inspection and local repair.

The largest part of the normal public sewerage system consists of circular pipes of 300–600 mm inner diameter. Obviously, they are not accessible for humans. The current state of the art to maintain such pipes uses tele-operated non-autonomous robot platforms. These platforms are connected to the outside world by a cable used for energy supply, for transmission of commands from the human operator to the device, for data transmission back to the operator, as a life-line in case the device gets stuck in the pipe, and as a measuring line for the distance traveled. However, the cable severely restricts the range of action of the maintenance devices by friction at the pipe inside after bends or after long straight tours, where "long" means typically 200 m here. This range restriction, in turn, adds considerably to the maintenance cost, because it forces the maintenance teams frequently to haul in the device, change the location, put the device back in, and continue working.

An envisable alternative to such tele-operated devices is using autonomous robots. However, the sewerage system is no easy place for robots to work. It is narrow, slippery, dirty, and wet. It can involve all levels of water from dry to completely flooded, where a typical water level in a sewage pipe at dry weather is 5–10%. It consists of pipes from different materials, where concrete, PVC, and ceramic are the most frequently used. It contains steps as in a connection between pipes of different diameters. It may include obstacles or damages like sediments, cracks, holes, non-expertly built junctions from smaller pipes, or roots grown into the pipes through cracks or leaking joints.

The studies reported here about were made with a prototype sewer robot platform that is able to physically navigate through test sewerage network, or briefly, test net.

Figures 1, 2:
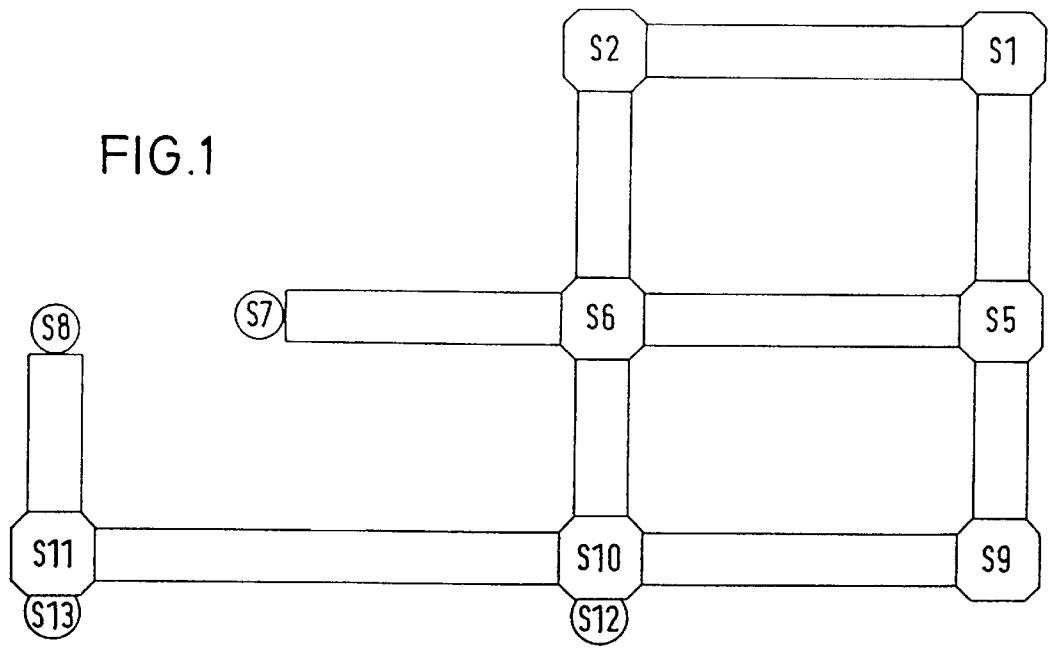
FIG. 1 is a schematic representation of the test-pipe network.
FIG. 2 is a table of the classification of the junctions of the test-pipe network of FIG. 1.

The network is built of concrete sewage pipes of 600 mm inner diameter. The total length is about 80 m. FIG. 2 shows the layout: The objects numbered S7, S8, S12, and S13 are open ends, the other S-numbered objects are shafts, constructed like manholes in an operational sewerage system while FIG. 2 shows the classification of the junctions.

In the following, the hardware design of the autonomous mobile robot system (referred to as robot) (Sect. 2) and its control architecture (Sect. 3) are described. Then, the rationales for the new control and navigation procedure are sketched (Sect. 4); in particular, there are described some results of experiments related to this procedure and made using the robot in the test net. Section 5 concludes.

2 Hardware Design

Hardware:

The system is constructed such that it is able to drive through long tube sections quickly and with a minimum of energy consumption. Turning at narrow and slippery junctions is possible with a minimum of mechanical wear out.

Sensors:

Even if some sensor redundancy is desired, the benefit of having more sensor information must be weighed against the computer power required for exploiting it. In the instant case, one should use few sensors and instead implement domain-dependent and cheap, yet robust algorithms which compensate for some uncertainty in the sensor interpretation and the resulting incompleteness of the internal representation.

Control software:

Again, robustness and reliability are mandatory. So, the control software should be modular and reflect a—probably hierarchical—decomposition of the global task into a set of robust functional modules. This approach should decrease the state space dimensions for the individual modules (by focusing on the relevant information).

The following subsections show how these constraints are respected in the robot's design.

2.1 Mechatronics

Figure 3:
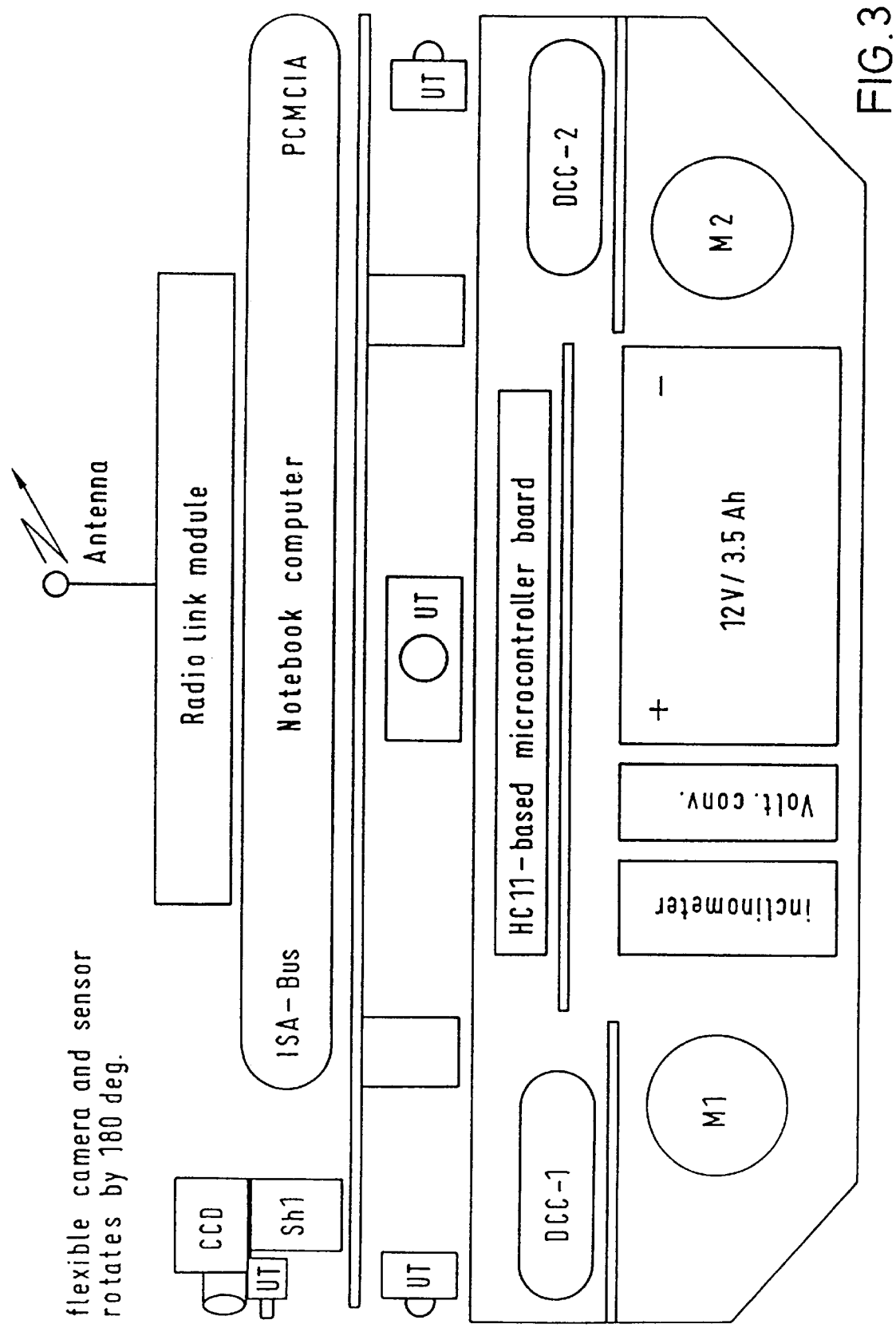
FIG. 3 is a schematic diagram of the hardware components of the robot in which the ISA-bus is a standard PC-interface which is equipped with a frame-grabber board, the PCMCIA interface is used to sample the analog signals from the ultrasound transducers and from the inclinometers, DCC1 and DCC2 are drive control circuits that control the motors M1 and M2, respectively, and S1 is the servo motor to move the CCD camera and the flexible ultrasound sensor.

The robot is a six-wheeled system of 38×28×30 cm size (L×W×H). Refer to FIG. 3 for the following description. The three wheels on either side of the vehicle are connected by transmission belts and form one propulsion unit. Each unit has one DC motor which can be controlled to move in two directions at any given number of revolutions ranging from 0 to about 60 per minute, thereby achieving a maximum speed of about 20 cm/sec. The motor is controlled using separate drive control circuits (DCC), which actively alter the voltage supplied to the motor, using pulse-width modulated (PWM) signals.

Because every unit has its own DCC, the robot can turn into any direction by rotating its left and right wheels into opposite directions. The DC-motors are equipped with odometers measuring the number of shaft revolutions. By counting the revolutions and taking the diameter of the wheels into account, some rough measure of the distance that the robot has travelled can be computed. Note, however, that slip in real sewage pipes is high, so navigation should not rely much on such a simple odometry.

The system is equipped with a rechargeable battery that provides sufficient energy for approx. 1 hour of operation in the test net.

2.2 Onboard computers

All necessary computations for control and navigation are distributed among two computers. First, there is a HCll-based microcontroller board for the basic control tasks like generating the appropriate PWM signals. Second, there is a standard notebook computer on which are implemented the higher level control modules as well as path generation and global positioning routines.

The notebook PC (i.e. microcomputer) processing unit is a fixed part of the robot, thus all computation is done onboard. Although this added weight implies further mechanical requirements for the robot hardware—like more complicated kinematics or the need for more battery power—there was no other choice for testing: The system has to operate in a sewage pipe, and in the real ones that lie, say, 4 m below street level, one cannot guarantee continuous wireless contact to the robot. Therefore, computer power could not be externalized. Confronted with that environmental constraint, it was the natural approach to use different computers to perform tasks asynchronously at different grades of complexity, while a bidirectional serial communication link served to transmit commands from the notebook to the microcontroller and status reports from the microcontroller to the notebook.

2.3 Sensors and communication

In the discussion of the principal components of the robot as shown in FIG. 3, the CCD camera and the radio link module are omitted so far. The camera can rotate by 180 deg. horizontally, thus covering all of the robot's front area.

The analog video signal of the camera is first collected by an onboard framegrabber, which is installed at the ISA-Bus slot of the PC, and then transmitted via radio link to the outside world. Note that the radio link makes sense only in the test sewerage system, where it is an extremely useful tool to monitor the robot's perception, decision making and action cycle. In a real sewerage system it would be highly unpredictable whether or not connection can be made, and a radio link is thus a questionable, power-consuming component. This does not apply for the camera itself, because pictures of damages can be taken in the pipe during autonomous operation and later transmitted to the outside world to inform a human operator. However, it is questionable whether video data should be used for navigation and/or self-localisation purposes inside a sewerage system, given the relatively high power consumption necessary to light up the place and the computational effort to extract useful information from video data. In the robot, the video data are not used for navigation.

This leads to the robot's sensors that do get used. First, there are two tilt sensors which are implemented in the chassis at the lowest physical level. These sensors measure the tilt along its two main horizontal axes. The information derived from these sensors is mainly collected by the microcontroller board—via an 8 bit A/D converter—approximately every 100 ms. In addition, there are five ultrasound transducers, which are mounted on the chassis of the system to cover most of the robot's front and side area. These devices measure the distance to objects up to 100 cm away at a resolution of 1 cm. They are well fit for navigation in the test net because the rough walls of the concrete pipes reflect sound well and at relatively wide angles.

Also shown in FIG. 3 is an additional ultrasound transducer that is mounted on top of the camera. Its purpose will be described below (Sect. 4).

3 Control Architecture

Figure 4:
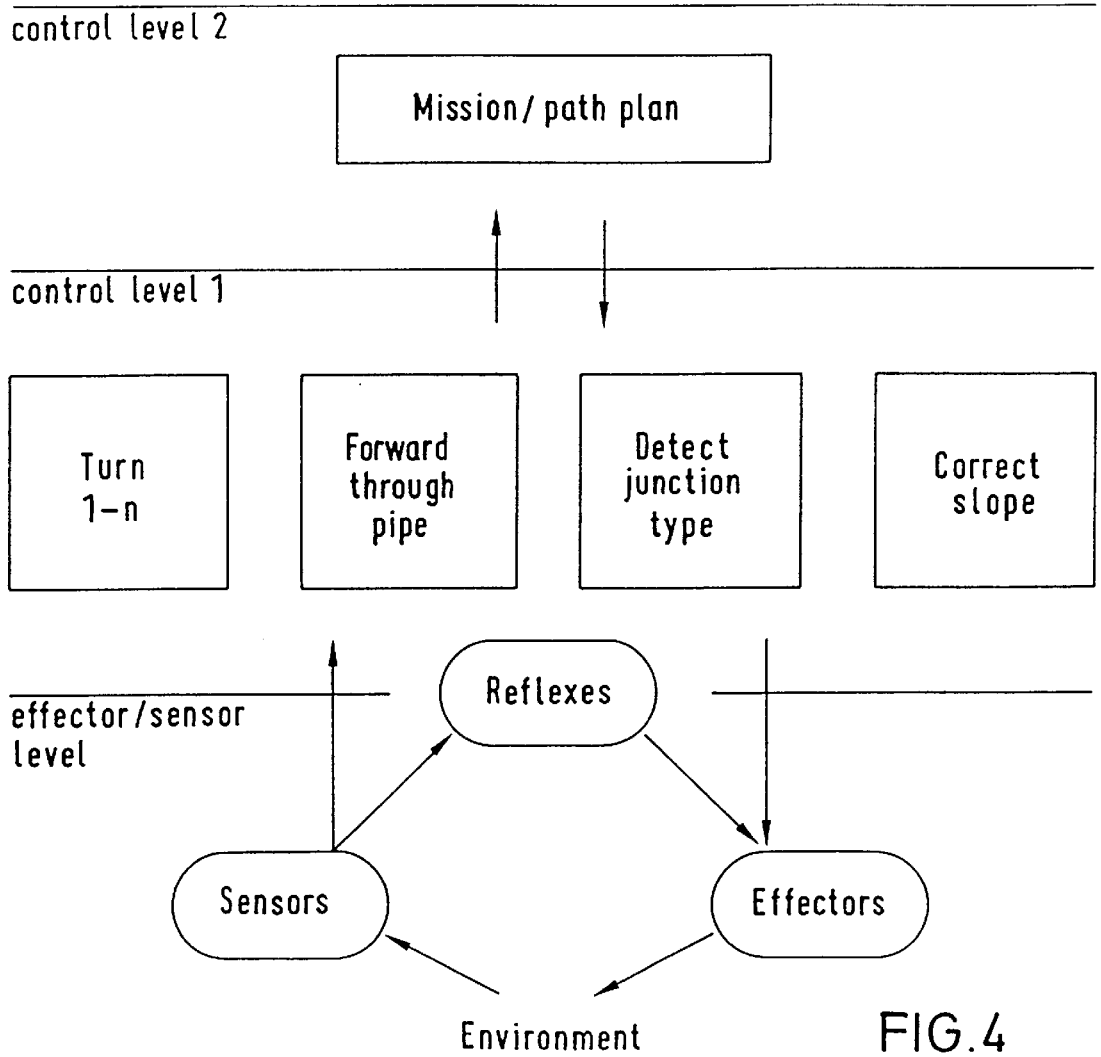
FIG. 4 is a schema of the 2 and ½ levels of control wherein arrows pointing upward denote data flow and arrows pointing downward denote control flow.

This section describes the robot's control architecture (FIG. 4) for navigating through the test net. It is decomposed into 2 and ½ levels. The lowest, "half" level contains a few reflexes or control-loops for reacting to critical situations immediately; examples for such reflexes are obstacle avoidance and, particularly important in sewage pipes, tilt-control. Level 1 is a set of finite state automata that implement the fundamental abilities for the robot to operate in a sewerage system. Level 2 contains high-level control algorithms such as a graph search algorithm, that, given a map of the environment, a start and goal position, computes an optimal path (in terms of a sequence of level 1 behaviors) to that goal. These levels are now addressed in more detail.

One of the basic low level tasks of the robot is to travel safely through a long straight pipe. It is thus mandatory to have a reactive mechanism that compensates for drift effects, which will occur from differences in traction in any wheel-based or chain-based robot in sewage pipes, no matter how sophisticated a hardware is used. Drifting in a sewage pipe would result in driving up the walls and possibly toppling over. Consequently, the robot has a reactive tilt-control, which is an example from its small set of "reflexes".

The reflexes depend only on the current sensor input, exhibiting a fixed reaction scheme that couples one sensor to one effector. They are immediately executed and report to the higher levels only later. In case the inclinometer senses an intolerable tilt, the microcontroller immediately performs a correction maneuver that brings the system back into stable position: depending on the most recent sensor reading (being tilted left or right) the left or right motor is accelerated or decelerated, respectively.

Only if this immediate reaction does not succeed, a level 1 behavior is activated, which stops the motors, deactivates the reflex, and performs a more complicated maneuver to bring the robot back into normal position. This level 1 behavior is completely located on and carried out by the microcontroller. The level 2 control program is informed that this behavior is activated and grants or rejects permission for execution. This enablement structure is useful because in some difficult cases—e.g., when turning at a junction—a moderate tilt is unavoidable for the robot and must be tolerated. However, the lower levels do not know, e.g., whether or not the robot is at a junction.

The representation used in level 1 is more abstract than the raw sensor data. It is made from high-level states like inside tube, near junction, at unknown junction, or at type x junction, where x is a classification like T-junction, L-junction, or X-junction-crossing. The state at unknown junction, e.g., is generated if the robot previously was in the state inside tube, then in state near junction, the left and right static ultrasound sensors signal that there is some junction now, but it has not yet been classified (see below how this gets done). Similar procedures are used to compute the other states listed above.

Generally speaking, level 1 can be described as a finite deterministic automaton, where the edges are labelled with perceptions that the robot has to make before a state transition can occur. For each state of this automaton, the system has a level 1 behavior that is active when the robot is in that state, thus a state transition also causes a new behavior to be activated. However, level 1 behaviors do not start automatically, but have to be explicitly activated by level 2.

The reason for that strategy is straightforward: On the lowest level of control, it is possible to tell more or less exactly what reflex or task has to be performed for a given sensor input. This turns more and more difficult to tell in advance when the tasks become more and more complex. A complex task usually involves multi-step decision making: first, the integration of more than one sensor is often needed; second, these readings have to be integrated and/or correlated over time; and third, they have to be interpreted within a given context.

In order to navigate to a previously specified position (usually a shaft), the system is equipped with a map. This map is a rough topological description such as the one shown in FIG. 2; it does not contain exact metrical information. The system can derive information from it such as: if driving through tube t in northern direction, then the next junction is an L-type junction. As the robot arrives at the next junction, it will verify whether or not the present junction is in fact of the type specified by its internal map. If so, then the system will generate an appropriate high level task, such as turning right or left—whatever is appropriate to reach the next subgoal. If the classification of the current junction leads to a different result than was expected from the map, then the robot has a problem. The level 2 algorithm dealing with this problem is described below (4.5).

4 Robot Control and Navigation: Concept and Experiments

The purpose of this section is twofold. It describes both the new control and navigation procedure in general and the experiment with using it. As a rule of thumb, the lower-level functionalities described at the beginning of the section are special for the experiment with the robot, and the higher-level procedures described towards the end are general. It will become clear from the context what is special and what is general.

4.1 Controlling tilt

Figure 5:
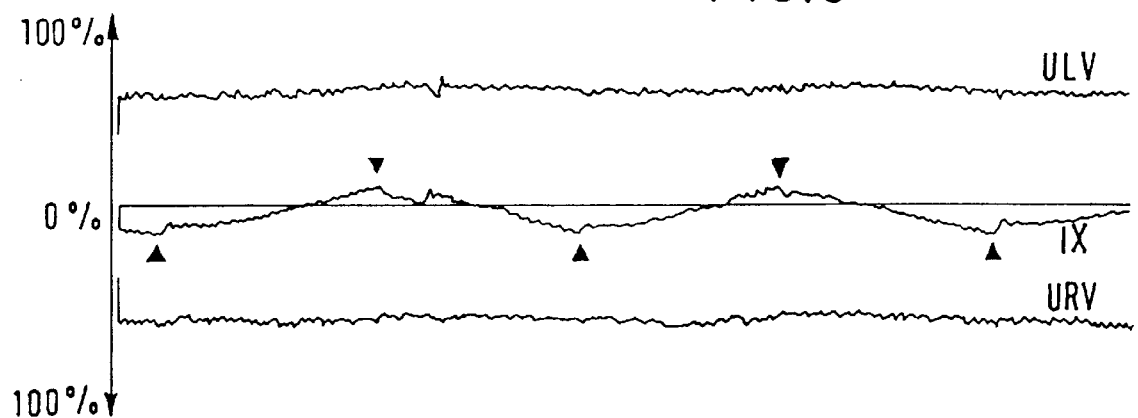
FIG. 5 is a diagram for tilt correction on the basis of tilt sensors wherein the curve IX represents the value from the tilt sensor measuring tilt around the main horizontal axis, the correction maneuver interferes at the marked positions, and, in addition to the tilt values, the measurements from the left (ULV) and right (URV) ultrasound transducers are shown the document that the data stems from one single pipe.

The first experiment deals with the robot's ability to drive through a straight tube without toppling over, by reacting to the data from its tilt sensors. FIG. 5 shows the tilt sensor values as they were taken at one trip through a pipe of about 10 m length. As can be seen, these values deviate from the ideal line (here as the straight line) and are brought back into a tolerance range. The extreme points of the curve IX in FIG. 5 mark the moments where the correction maneuver was triggered, bringing the robot back into a stable position.

However, after a while the system is tilted again, this time to the opposite site. The reason is that after correcting the position, the robot is not positioned parallel to the pipe axis, which it cannot sense using its given sensor configuration. However, this is not critical as long as the tilt correction works properly.

4.1 Passing pipes and detecting junctions

This test demonstrates the robot's ability to travel through a pipe until arrival at the next junction. It requires two basic perceptual abilities: encoding from the raw ultrasound reading that the system is in a tube, and knowing that it approaches or has reached a junction. Both perceptions must be executed with high precision because if, e.g., the robot erroneously believes that it is at a junction and initiates a turning maneuver, then it might damage itself. Due to sensor noise, these perceptions must not respect local ultrasound readings only. Instead, the time series of sensor readings must be taken inito account to derive more reliable information.

Figure 6:
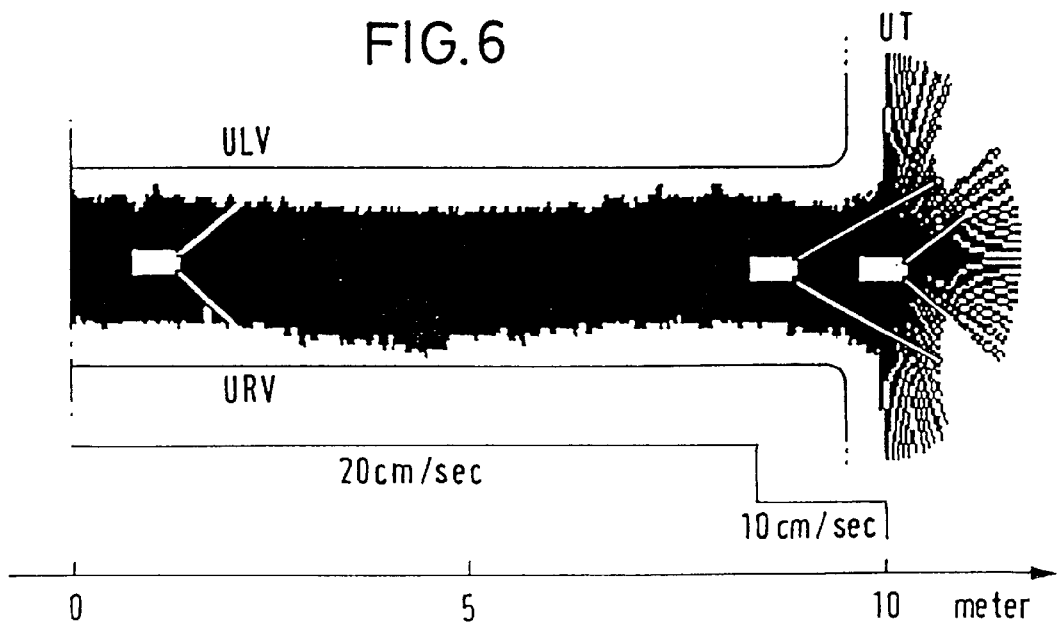
FIG. 6 is a plot of the ultrasound values front left (ULV) and front right (URV) while travelling through a pipe wherein the white rectangle represents the robot with the ultrasound beam going out to the left and the right, wherein at the right side of the Fig., the values read by the flexible ultrasound sensor (UT) are plotted as recorded when performing a 180 degree scan at a junction entrance, and wherein the characteristic pattern of an X-type junction is visible (here not distorted by noise) and, additionally, the travel speed is indicated.

The following approach is used. The data stream is filtered to eliminate the high frequency components of the noise. The low frequencies are not eliminated, because they correspond to the robot's drift while passing through the pipe. Knowing about the drift helps, because it facilitates to predict that the robot is approaching a junction. The low frequency components in the data streams from the front left and front right sensors show identical patterns as long as the robot is just drifting in the pipe. However, as soon as the system approaches a junction, they are phase shifted by 90 deg. or show different uncorrelated patterns. In FIG. 6, this effect can be seen from the sinusoidal patterns in the respective sensor readings: they are in phase most of the time, whereas they start to get out of phase after approx. 9 m—the robot approaches a junction.

So, in order to perceive that the system approaches a junction, there is used a moving window technique on the data from the front left and front right sensors. First, the high frequency components were eliminated, filtering out local noise. Second, the trend of the data in the two windows is computed, extracting the information whether it is positive, constant or negative, as easily computable from the sign of the first derivative. An upcoming junction is heralded by a trend difference. The robot would then slow down to half speed and be attentive to its left and right sensors, which emit their signals at an angle of 90 deg.

The type of difference in the trend values even yields some information about the type of crossing that one is approaching; in FIG. 6, the trend values of both the left and right sensors are positive, indicating that the crossing is opening both to the left and to the right. This method is not used to classify the junction (see Sect. 4.3), but it gives some information about at which sensors the robot should look next to detect definitely that it is at a junction. So the strategy here is to use the information at hand for minimizing the number of samples (sensors to look at) that must be taken into account to make the next observation.

Different window lengths were tested. At a basic sampling frequency of 10 Hz and a maximum speed of 20 cm/sec, 20 cm of travelled distance were covered approximately when using a window length of 10. The optimal value depends on the frequency of the drift, which must be in harmony with the window length.

4.3 Classifying junctions

The navigation method described here requires the ability to identify different types of landmarks—it is not necessary to identify individual ones. Instances for landmark types in a sewer, which are also present in available sewer maps, are junctions and inlets.

Obviously, the exact technical procedure to classify landmarks depends on their exact form and on the sensor configuration available. For example, it makes a difference whether the inside of pipes and shafts is made of concrete, of PVC, or of ceramic, whether the sewer has been under operation or not, and whether it is mostly dry or filled with sewage—different circumstances may require different sensor configurations and different algorithms to classify landmarks. There should be a way to detect and classify landmarks in a sewer for each of these conditions. The classification is allowed to be unreliable in the sense to be explained below.

To give a concrete example, it is described here the active-perception-based heart of the landmark classification procedure used in the robot in the test net. Keep in mind that this is a working instance of the general type of classification procedure that the navigation method requires.

For navigating through the test net, the robot uses only junctions as landmarks. These are concrete shafts of basically four different types: T, L, X, and exit. For the T and L types, there are sub-forms corresponding to the angle from which the junction is approached, e.g., "Left L" or "T from mid-leg". In order to safely navigate through the test net, it suffices that the robot can identif the type of a junction rather than individual ones.

Active perception is achieved in the robot by using a rotating ultrasound transducer. It delivers distance measurements to objects within a range of 100 cm. The sensor can be rotated actively by 180 degrees horizontally to produce a one-dimensional distance snapshot of the robot's front area. 90 data points are acquired during such a scan that show characteristic patterns (see FIG. 7).

Due to sensor noise and to differences in position of the system when taking the scan, this data cannot be classified straightforward. Therefore a neural network for classification is used. The input consisted of 22 data points plus the values from the tilt sensors (used to encode abnormal positions at a junction). The three-layered network learned to activate one of eight output neurons representing one of eight situations at a junction of a given type, respectively.

The network was trained off-line with real scan data that was acquired in earlier runs in the test net. A total number of 80 training sets were generated and fed in at stochastic selection. Because the generalised delta learning rule was used, the backpropagation error from the difference between the desired output vector and the one generated from the network at each trial, was computed. After off-line training, the weight matrix was saved and reloaded later, when the system had to operate in the test net. This time, the robot used the network to classify the types of junctions that it encountered. When the system arrived at a junction, it performed a scan to acquire the actual data and have the network do the classification. FIG. 2 shows the number of correct/uncertain classifications for all junctions.

As these data show, the network is not sure to produce correct results. One reason is that, due to sensor noise, there may be patterns in the scans that the backprop procedure fails to approximate. Yet, the results show that the network works fine in most cases. So, instead of putting more effort into its training, it was decided to couple the classification from the network with a heuristic approach to raise the probability of correct classifications: data from the self-localization on the internal map (see Sec. 4.5) is used. In case of a discrepancy between how the network classified the junction and what is expected from the internal map, the classification procedure was retried: the robot would pull back into the pipe, approach the junction, and classify again.

FIG. 2 also shows the results after retrying. Even though no incorrect classifications after retry were left in the tests, discrepancies may occur even then. There are two ways to proceed in this case: first, the robot keeps retrying. This is appropriate if malclassifications are very likely to occur. Second, if the classification keeps being reproduced, then the robot must have taken a wrong turn at one of the previous junctions. The next section focuses on how that problem is handled in the navigation method.

4.4 Turning at junctions

Because of various unpredictabilities in any real world domain, a behavior like turning at a junction cannot be implemented as a fixed macro. It must work in a closed-loop manner: at each moment in time, the system perceives the world through its sensors and computes the next action from these readings in the context of the current task. Thus, if the system intends to perform a 90 deg. turn to the right at some specific junction, it has to perform actions until the sensor data that it samples reflects the situation that is expected after a 90 deg. turn to the right at that junction.

There was implemented the straightforward approach: split up the overall maneuver into different phases—three in this case. In the first phase, the robot drives forward into the junction and tries to turn by 45 degrees. As the bottom of a junction is not flat but dented, i.e., the system is not certain to have continuous traction, the actual turning is achieved by switching between two compound movements: turn while pulling back, and turn while driving forward. (See FIG. 8 for a junction.) During this maneuver, the system tries to identify a set of previously defined situations in order to keep track of how far it has already turned. The set of situations is different for the different types of junctions, of course. At a regular X-type junction, for example, the system would first try to identify the point when it passed the ridge at the front right or left side, which is formed by the convergence of two metrically orthogonal tubes. Only if this situation was encountered, it enters the second phase.

In this phase, the robot keeps turning until its front sensors indicate that it is positioned in front of a tube. Again, this is not trivial. For example, the readings of the side and front/side sensors are distorted by a combination of the tilt of the whole device in the crossing and the (a priori unknown) geometry of the shaft. An easy and reliable information found, was the readings of the front sensor, which has to indicate open space. The third phase is used to finish the overall maneuver reliably. During this phase the system simply tries to enter the pipe, which it believes to be right in front of. Two things may happen: first, there is really no pipe in front and second, the robot is not correctly positioned in front of the pipe. In the first case, the system would stop either because it detects an obstacle ahead or—if the front sensor fails to detect the wall—because it tries to drive up the wall and is interrupted by the tilt sensors. In the second case, the system would enter the tube but it would be tilted to the left or right side. This will also be detected, and the balance reflex would interfere and correct the position. However, after that the system will definitely notice that the situation encoded by its sensors corresponds to that perceived when driving through a tube. In this case the turning maneuver is finished and the internal state updated.

4.5 Self Localization and Navigation

Given a topological map of a sewerage network like the one in FIG. 1, planning a path from a given start point to a specified goal position is trivial: just do graph search. To make it even easier, the real sewerage networks have a mostly tree-like structure with only few cross connections. So if there is a problem in navigation, it is not in path planning.

The challenge is to monitor path following. Note that data from Global Positioning Systems (GPS) is inaccessible in real sewerage networks under ground. Should the network be crowded with autonomous robots one day, it might be worth the effort to install easy-to-detect labels at manholes—for the time being, a sewerage robot has to do without. It has to rely on its on-board sensor capacity for determining where it is.

So the problem is one of self-localization on the map of a sewer, which was considered here in its topological variant: The main interest is not the metric positions, but only the qualitative positions of the sort "At shaft $S_i$," or "In connection between shafts $S_i$ and $S_j$". At-shaft positions must be further specified, indicating the adjacent connection from which the robot has approached the shaft. For example, the position S6-7 in the test net indicates that the robot is at S6, coming from S7. The test net induces 21 positions of this kind, given that the outlets S12 and S13 are directly adjacent to their respective neighbor shafts, cf. FIG. 1. In this application, the main attention is drawn to these positions at shafts, because they induce the qualitative positions in connection pipes.

While the real robot can physically be at no more than one position at one time, the uncertainty of junction classification and the possibility of fault in the control of turning maneuvers may yield a non-zero plausibility for more than one position where the robot supposes it might actually be. Taking the most plausible position for granted as being the actual one runs the risk of getting lost if this high plausibility was different from truth.

To overcome this problem, there was used a POMDP as referred to above, the essence being to encode explicitly in the current internal robot state any remaining uncertainty about the actual physical position. Technically, this is done by considering the self-localization problem to be a partially observable Markov decision process (POMDP). Sophisticated algorithms for solving such problems can also be used, preferring ease of the exposition to efficiency.

The basic notion is that of a belief state, i.e., a probability distribution over all possible positions. Such a belief state is expressed by way of a vector $b = [v_i]$, with the definitory property that $1 = \Sigma_i v_i$. The value of each component is to be interpreted as the "degree of belief" that the robot is physically located at the respective position. Practically, most components would be 0 most of the time, indicating subjective certainty of not being at that respective position. In the example of the test net, a belief state is a vector of 21 components.

As the start of a working example, assume that the robot is certain to be at S6-7. The belief state representing this is $$b_0 = \begin{bmatrix} S1-2 & \cdots & S6-5 & S6-7 & S6-10 & \cdots & S11-13 \\ 0 & & 0 & 1 & 0 & & 0 \end{bmatrix}$$

where the 1 figures on the vector component representing position S6-7.

At the level of abstraction that is interesting for self-localization and navigation, a robot action leads from one position to another. On a lower level of description, it consists of entering into a shaft, turning in the appropriate exit, and driving through the respective pipe to the next shaft entrance, i.e., the next position. At this level of abstraction, the following set of actions for navigating through the test net can be denoted: TURN-LEFT, TURN-RIGHT, GO-STRAIGHT, and U-TURN. More high-level actions may be useful in a sewer with a different topology.

In reality, none of these high-level actions can be executed with total precision. For example, the implementation of TURN-RIGHT in the robot initiates a turning maneuver to the right that is controlled by the readings of the front and front-side US sensors, which are assumed to detect correctly the entrance to the right "as it comes along". It may happen that an entrance is overlooked, resulting in a U-turn rather than a right-turn. The probabilities of the respective actual outcomes of an action have to be estimated or empirically tested a priori. For the robot in the test net, assume that TURN-RIGHT works correctly in 90%, results in a U-turn in 4%, and results in no turn (going straight) in 6% of all cases, provided that the respective junction is such that there is a way to go straight; otherwise assume TURN-RIGHT works correctly in 96% and U-turns in 4%.

A new belief state results from executing an action a, given a belief state b. To calculate it, a special (yet straightforward) representation of the action effects as a probability matrix $E_a = [a_{i,j}]$ is exploited. This is a n×n matrix, where n is the number of possible positions, which is also the length of the belief state vectors—21 in the test net. The i-th row of $E_a$ contains the probability distribution of the results of executing a, provided that the robot was on the i-th position. As a definitory property $1 = \Sigma_j a_{i,j}$ for all rows i that correspond to a junction where turning right is possible; all other rows are 0-vectors. FIG. 9 shows a part of the effect matrix of TURN-RIGHT for the robot in the test net.

Using this representation of action effects, the belief state res(a,b) that results from executing an action a in belief state b is straightforward calculated as $$res(a,b) = bE_a \quad (1)$$

As an example, let us compute the belief state resulting from the robot turning right in belief state bo above. Let E be the effect matrix of TURN-RIGHT, then $$b_1 = res(b_0, E) = \begin{bmatrix} \cdots & S5-6 & \cdots & S7-6 & \cdots & S10-6 & \cdots \\ & .06 & & .04 & & .90 & \end{bmatrix}$$

The $b_1$ positions not shown have 0 probability.

Another way to change a belief state is a sensor measurement after arrival at some junction. Although this has—different to the execution of a turn action—no impact on the real position of the robot, it may influence the subjective degree of belief of being at a certain position, which is precisely the interpretation of a belief state. Technically: After the robot—using the technique from Section 4.3—has classified the shaft corresponding to its recent position, the belief state is changed reflecting whether or not the classification was in harmony with it.

The respective calculation requires as input conditional probabilities of which classification results are to be expected at which class of landmarks. These probabilities can be estimated or determined empirically for a given environment and sensor configuration. For example, assume that the following values for the robot in the test net are given:

Pr("T mid-leg" | "T mid-leg") = .8
Pr("T mid-leg" | "Exit") = .05

This is to be interpreted as, e.g.: Being physically positioned at the mid-leg of a T-type junction, the landmark classification will return that very junction type in 80% of all cases (which is the rate of correctness of the first classification try at S10 in FIG. 2).

To calculate the new belief state after a sensor measurement, each component $v_i$ of the old belief state b is weighed with $Pr(\tau|v_i)$, where $\tau$ is the junction type that the classification has returned. In addition, all components have to be normalized to yield a proper probability distribution. This is done in the straightforward way, resulting in the belief state update rule for sensor measurements:

$$\text{sense}(\tau, b) = \left[ v_i \cdot \frac{Pr(\tau | v_i)}{\sum_{i=1}^{n} Pr(\tau | v_i) v_i} \right] \quad (2)$$

To continue the working example in the test net, assume that the junction classification yields "T mid-leg" after arriving at the next junction in belief state $b_1$.

According to (2), this results in the new belief state $$b_2 = \begin{bmatrix} \cdots & S5-6 & \cdots & S7-6 & \cdots & S10-6 & \cdots \\ & .0623 & & .0026 & & .9351 & \end{bmatrix}$$

The plausibility of being at S7-6 has considerably decreased, according to the low probability of mis-classifying an exit as a "T mid-leg" junction. The probabilities for being at S10-6 or S5-6 have increased as they are both compatible with the classification.

The probabilities turn very small for positions that correspond to chains of relatively improbable action effects or junction mis-classifications. It makes sense to wash out and distribute to the other components after each belief state update those probabilities that have fallen below some to-be-specified threshold. In the example, assume that 0.0026 for S7-6 is below the threshold and that the distribution is done proportionally to the remaining probability values. After that the new belief state is $$b_3 = \begin{bmatrix} \cdots & S5-6 & \cdots & S10-6 & \cdots \\ & .0625 & & .9375 & \end{bmatrix}$$

So, the robot would be much convinced of being at S10-6, and provided that prior path planning has determined that shaft as a landmark to pass, it would suspect to be still correct. In general, there has to be a procedure to calculate from a belief state a plausible position that is assumed to be the physical position of the robot after sensing. One possible method for that is to specify a threshold $\Delta$, requiring that the position with the highest probability according to the recent belief state has to be more probable by at least Δ than the other positions. If no position is currently plausible, sensing has to be re-tried.

As described in the above-mentioned POMDP-related reference, the advantage of keeping marginal probabilities for positions that would correspond to a small number of errors in movement control and/or junction classification, comes into play if and when these errors have actually occured. In the example, imagine that the TURN-RIGHT action went wrong, resulting in the robot physically going straight to the position S5-6. The next measurement cannot detect this fault as a "T mid-leg" junction is expected at both the correct and the wrong junction. The fault can only be detected at the next junction. Assume that the path plan told to turn right at S10, going to S11. Again, a "T mid-leg" junction is expected. However, on the wrong path, turning right leads to S9, which is of a different type.

If there is discrepancy between the expected and the sensed, classification is repeated, as described in Section 4.3. If the first wrong measurement was just a fault, the effect will wash out after one or several retries. If the unexpected measurement is reproduced, the belief state will change, increasing the probability for a different position. In the example, if after the right-turn supposedly at S10 (but in fact at 5) an "L right" junction is detected, the probability for S9-5 as the recent position increases, and the probability for the expected S11-10 decreases. Repeating the classification is expected to further add plausibility for S9-5, until it becomes the expected junction. The path plan has then to be updated, and navigation continues accordingly.

In the following the procedure as motivated and described in this section is briefly repeated, wherein a pseudo-code formulation of the navigation procedure is used and the input variables are the currently belief state b and the path plan Π:

1. If the plausible position p induced by b is the goal position of Π, then stop.
2. Initiate turn maneuver according to Π to go from p to the next planned position. Update b according to equation (1).
3. Classify the landmark at the new position, updating b according to equation (2).
4. If the classification is the expected one according to the state of executing Π, then continue at 0.
5. Else: Until b induces a plausible position p, repeat classifying the new position, updating b according to equation (2).
6. If p is different from the position originally expected according to Π, then replan Π accordingly. Continue at 0.

5 Summary

In domains that are not specially designed or adapted for being inhabited by autonomous mobile robots, self-localization and navigation are notorious problems. In particular, the classification of landmarks can be expected to be unreliable. If, in addition, the motion control is less than perfect, there is some danger of getting lost, unless there is a global orientation framework, like the GPS, to rely on.

Figure 10:
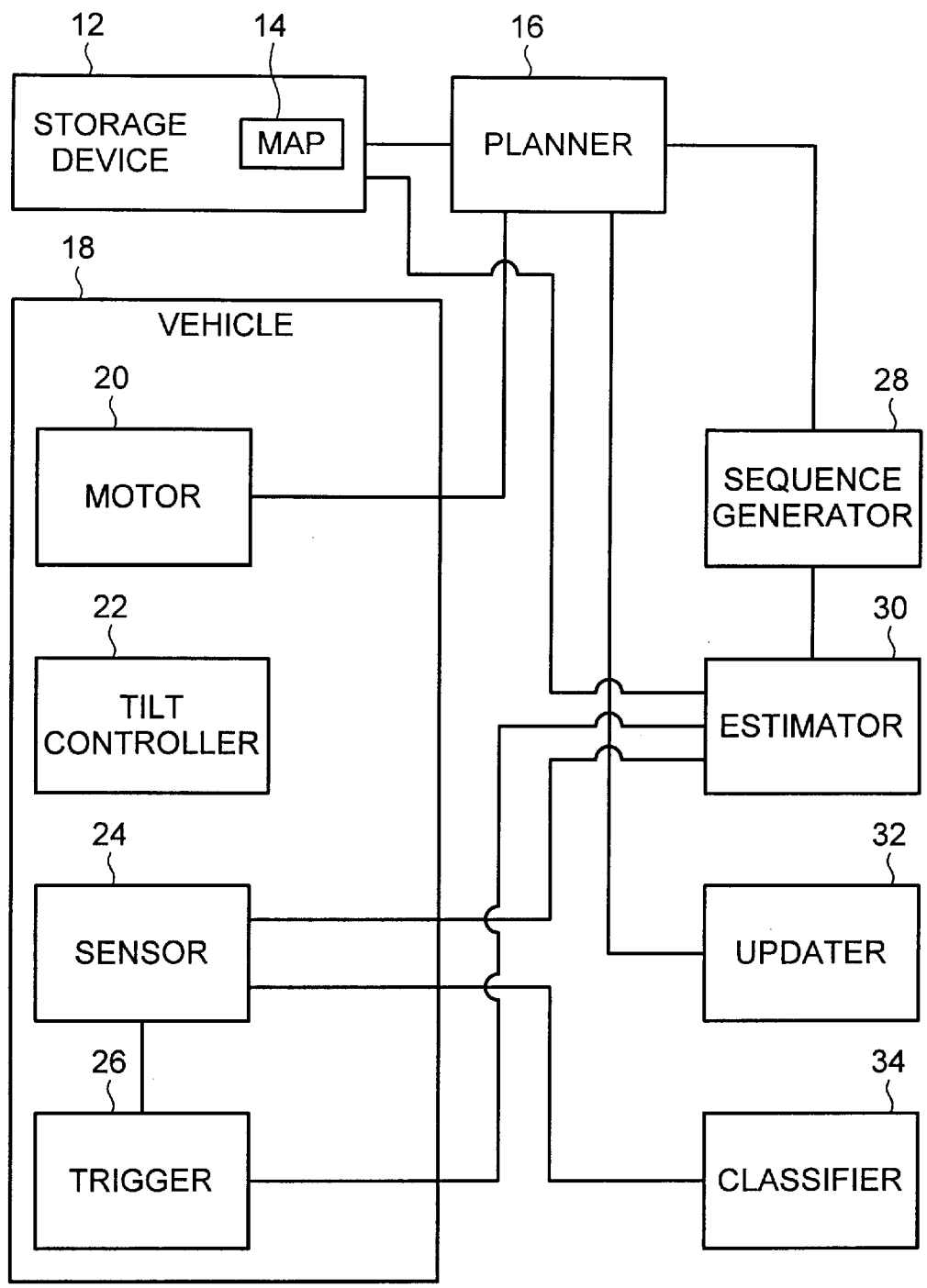
FIG. 10 is a block diagram of an autonomous mobile robot system in accordance with the invention.

FIG. 10 illustrates a block diagram of an autonomous mobile robot system 10 for a sensor-based and map-based navigation in a pipe network. The navigation of a vehicle 18 for moving through the pipe network may be based on classification of pre-existing landmarks. The system 10 includes a storage device 12 for storing a topological map 14 of landmarks. A planner 16 determines an original path plan through the pipe network from a starting point to a destination point of the topological map 14. A motor 20 or another locomotion device is capable of moving the vehicle 18 in the pipe network according to the path plan. A tilt controller 22 of the vehicle controls the tilt of the vehicle 18 along its axis of motion and controls the position of the vehicle 18 within the pipe with reference to the pipe's bottom. A sensor 24 senses the vehicle's environment so that the vehicle 18 can detect the presence of any landmark that the vehicle 18 passes while navigating through the pipe network. A classifier 34 classifies the detected landmarks sensed by the sensor 24 in terms of defined landmark classes. Each detected landmark may be assigned to a corresponding defined landmark class within the defined landmark classes. A sequence generator 28 generates a sequence of landmark classes associated with the corresponding landmarks to be encountered while following the original path plan through the pipe network. The estimator 30 determines a currently plausible position of the vehicle 18 with respect to the topological map 14 based on the expected landmarks and the classes of landmarks recently passed. A trigger 26 triggers at least one additional reading of the sensor 24 for detecting any landmark if the estimator 30 cannot determine the currently plausible position in the pipe network according to currently available data on the expected landmarks and on the classes of the passed landmarks. An updater 32 updates the path plan if the currently plausible position differs from an expected position expected according to the original path plan of the planner 16.

The tilt controller 22 may be used to keep the vehicle 18 at the pipe bottom. The tilt controller 22 preferably includes one or more inclinometers for measuring the vehicle's tilt along it's axis of motion. The tilt controller 22 steers the vehicle 18 back to the pipe bottom if at least one of the inclinometers senses a sufficient tilt. The sensor 24 provides motion control for turning maneuvers of the vehicle 18 at pipe junctions. The sensor 24 may provide a closed loop procedure of a turning movement controlled by the sensor 24 until the sensor 24 signals that the target pipe entry is in front of the vehicle 18. In one embodiment, the sensor 24 for sensing the vehicle's environment may comprise ultrasound transducers. Some of the sensors 24 are preferably movable with respect to the vehicle 18 to produce scans of the geometrical surface of the vehicle's environment. For example, after detecting the presence of a landmark the vehicle 18 may be instructed to remain motionless close to the landmark and the sensor 24 may inquire input data for the defined landmark classes while sensing the environment in a manner that includes moving one or more sensors 24 with respect to the vehicle 18.

The system 10 includes a classifier 34 that may comprise a back propagation network for accepting an input from an output of a sensor 24. The classifier 34 outputs a classification of the landmark in terms of defined landmark classes. In one embodiment the landmarks include pipe junctions of different geometrical shape classes. For example, pipe junctions of different geometrical shape classes may include an X-shape junction, a Y-shape junction, a T-shape junction, or an L-shape junction. The estimator 30 is adapted to estimate the currently plausible position of the vehicle 18 in the pipe network. The estimator 30 may model the determination of the currently plausible position as a partially observable Markov Decision Process.

In this application, there is presented a method designed for navigation in sewerage systems; it has been tested in experiments using the robot platform the robot. It relies on being applied in sewerage systems (rather than, say, an office building equipped with landmarks) in a number of aspects. For example, motion control errors are known to be discrete in the sense that the robot takes either the right turn or a wrong one, but there is no way of drifting slowly into a wrong direction. Whereas the classification of a landmark is practically somewhat unreliable, the detection of landmarks can be assumed to work with perfection: In a sewerage system, junctions (or at least most of the junctions) have to be in manholes, and it is relatively easy to detect entering into a manhole opening up 4 m in height when exiting from a narrow pipe. More requirements have been stated in the text, like the existence of a reliable map, the existence of a finite (and hopefully small) set of landmarks, and others.

What is claimed is:

1. An autonomous mobile robot system for sensor-based and map-based navigation in a pipe network based on classification of landmarks, said system comprising:

a vehicle for moving through the pipe network;

a storage device for storing a topological map of landmarks;

a planner for determining in advance an original path plan through the pipe network from a starting point to a destination point of said topological map;

a motor for moving said vehicle in the pipe network according to said path plan;

a tilt controller for controlling the tilt of said vehicle along its axis of motion and for controlling the position of the vehicle within the pipe of the pipe network at a pipe bottom;

a sensor for sensing said vehicle's environment such that the sensor is capable of detecting the presence of the landmark that the vehicle passes while navigating through the pipe network;

a classifier for classifying, said detected landmarks sensed by the sensor in terms of a defined landmark classes;

a sequence generator for generating a sequence of landmark classes associated with the corresponding landmarks to be encountered while following said original path plan through the pipe network;

an estimator for determining a currently plausible position of said vehicle with respect to the topological map based on the expected landmarks and on the classes of the detected landmarks recently passed;

a trigger for triggering at least one additional reading of the sensor for detecting any landmark if the estimator cannot determine the currently plausible position in the pipe network according to currently available data on the expected landmarks and on the classes of the passed landmarks, and an updater for updating said path plan if said currently plausible position differs from an expected position expected according to the original path plan of the planner.

2. The system according to claim 1 wherein said tilt controller for keeping the vehicle at the pipe bottom comprises one or more inclinometers for measuring the vehicle's tilt along its axis of motion and the tilt controller steering the vehicle back to the pipe bottom if at least one of said inclinometers senses a sufficient tilt.

3. The system according to claim 1 wherein the sensor provides motion control for turning maneuvers of said vehicle at pipe junctions as a closed-loop procedure of a turning movement controlled by said sensor until said sensor signals that the target pipe entry is in front of the vehicle.

4. The system according to claim 1 wherein the sensor for sensing said vehicle's environment comprise ultrasound transducers, some of the transducers being movable with respect to the vehicle to produce scans of the geometrical surface of the vehicle's environment.

5. The system according to claim 1 wherein said classifier comprises a backpropagation network accepting an input from an output of said sensor and outputting a classification of the landmark in terms of said defined landmark classes.

6. The system according to claim 1 wherein, after having detected the presence of a landmark, said vehicle is motionless close to the detected landmark, and the sensor for acquiring the input data for said landmark classification may be moved with respect to the vehicle while sensing the environment.

7. The system according to claim 1 wherein said estimator is adapted to estimate the currently plausible position in the pipe network by modelling the determination of a position in the pipe network as a Partially Observable Markov Decision Process.

8. The system according to claim 1 wherein said pipe network is a network of sewerage pipes.

9. The system according to claim 1 wherein said vehicle has wheels.

10. The system according to claim 1 wherein said landmarks comprise pipe junctions of different geometrical shape classes selected from the group consisting of an X-shape, a Y-shape, a T-shape, and an L-shape.

11. A mobile robot system for navigation in a pipe network, said system comprising:

a vehicle for moving through the pipe network;

a storage device for storing a topological map of landmarks;

a planner for determining in advance an original path plan through the pipe network from a starting point to a destination point of said topological map;

a sensor for sensing surroundings of the vehicle such that the sensor is capable of detecting the presence of the landmark that the vehicle passes while navigating through the pipe network;

a classifier for classifying said detected landmarks sensed by the sensor in terms of a defined landmark classes;

a sequence generator for generating a sequence of landmarks to be encountered while following said original path plan through the pipe network;

an estimator for determining a currently plausible position of said vehicle with respect to the topological map based on the expected landmarks and on the classes of the detected landmarks recently passed; and an updater for updating said path plan if said currently plausible position differs from an expected position expected according to the original path plan of the planner.

12. The system according to claim 11 further comprising a tilt controller including at least one inclinometer for measuring a tilt of the vehicle along its axis of motion and the tilt controller being adapted to steer the vehicle back to a lower tilt if the at least one inclinometer senses a sufficiently high tilt.

13. The system according to claim 11 wherein the sensor provides motion control for turning maneuvers of said vehicle at pipe junction as a closed-loop procedure of a turning movement controlled by said sensor until said sensor signals that the target pipe entry is in front of the vehicle.

14. The system according to claim 11 wherein the sensor comprises an ultrasound transducer being movable with respect to the vehicle to scan surroundings of the vehicle.

15. The system according to claim 11 wherein said classifier accepts an input from the sensor and outputs a classification of a landmark.

16. The system according to claim 11 wherein, after having detected the presence of a landmark, the sensor is moved with respect to the vehicle.

17. The system according to claim 11 wherein said estimator is adapted to estimate the currently plausible position in the pipe network by modeling the determination of a position in the pipe network as a Partially Observable Markov Decision Process.

18. The system according to claim 11 wherein said landmarks comprise pipe junctions of different geometrical shape classes selected from the group consisting of an X-shape, a Y-shape, a T-shape, and an L-shape.

* * * * *